(12) United States Patent
Ishida et al.

(10) Patent No.: US 10,003,098 B2
(45) Date of Patent: Jun. 19, 2018

(54) FUEL CELL

(71) Applicant: HONDA MOTOR CO., LTD., Tokyo (JP)

(72) Inventors: Kentaro Ishida, Wako (JP); Seiji Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 595 days.

(21) Appl. No.: 14/489,489

(22) Filed: Sep. 18, 2014

(65) Prior Publication Data

US 2015/0079491 A1    Mar. 19, 2015

(30) Foreign Application Priority Data

Sep. 19, 2013  (JP) .................................. 2013-193616

(51) Int. Cl.
*H01M 8/02*        (2016.01)
*H01M 8/2457*   (2016.01)
(Continued)

(52) U.S. Cl.
CPC ....... *H01M 8/2457* (2016.02); *H01M 8/0258* (2013.01); *H01M 8/0267* (2013.01); *H01M 8/0271* (2013.01); *H01M 8/0273* (2013.01); *H01M 8/0276* (2013.01); *H01M 8/1004* (2013.01); *H01M 8/241* (2013.01); *H01M 8/2483* (2016.02); *H01M 2250/20* (2013.01); *Y02E 60/521* (2013.01); *Y02T 90/32* (2013.01)

(58) Field of Classification Search
CPC ............ H01M 8/0258; H01M 8/0267; H01M 8/2483; H01M 8/0271; H01M 8/0273; H01M 8/0276; H01M 8/2457; H01M 8/241; H01M 8/1004; H01M 2250/20; Y02E 60/521; Y02T 90/32
See application file for complete search history.

(56) References Cited

U.S. PATENT DOCUMENTS 7,008,584 B2    3/2006   Inoue et al.
7,138,081 B2   11/2006   Inoue et al.
(Continued)

FOREIGN PATENT DOCUMENTS

JP   2010-153175       7/2010
JP   2011-018540       1/2011
JP       4733915 B2    7/2011

*Primary Examiner* — Nicholas P D'Aniello
*Assistant Examiner* — Philip A. Stuckey
(74) *Attorney, Agent, or Firm* — Mori & Ward, LLP

(57) ABSTRACT

A fuel cell includes a membrane electrode assembly and separators, an inner sealing member and an outer sealing member, a coolant channel, a base seal, an inner protrusion and an outer protrusion, and a middle protrusion. The membrane electrode assembly and the separators are stacked in a stacking direction. The inner sealing member and the outer sealing member are disposed between a first separator and a second separator. The base seal is disposed on at least one of separator surfaces between the second separator and a third separator. The inner protrusion and the outer protrusion are provided on the base seal so as to respectively overlap the inner sealing member and the outer sealing member when viewed in the stacking direction and so as to protrude between the second separator and the third separator in the stacking direction.

17 Claims, 3 Drawing Sheets

(51) Int. Cl.
*H01M 8/0271* (2016.01)
*H01M 8/2483* (2016.01)
*H01M 8/241* (2016.01)
*H01M 8/1004* (2016.01)
*H01M 8/0267* (2016.01)
*H01M 8/0273* (2016.01)
*H01M 8/0276* (2016.01)
*H01M 8/0258* (2016.01)

(56) References Cited

U.S. PATENT DOCUMENTS

| | | |
|---|---|---|
| 7,344,794 B2 | 3/2008 | Tanaka et al. |
| 7,491,355 B2 | 2/2009 | Inoue et al. |
| 8,551,671 B2 | 10/2013 | Ishikawa et al. |
| 2005/0079400 A1* | 4/2005 | Sugiura ............... H01M 8/0206 429/483 |
| 2006/0110651 A1* | 5/2006 | Wakahoi ............ H01M 8/0263 429/483 |
| 2009/0004539 A1* | 1/2009 | Ishikawa ............ H01M 8/0273 429/434 |
| 2012/0107718 A1* | 5/2012 | Masaka ............... H01M 8/0202 429/482 |

* cited by examiner

FUEL CELL

CROSS-REFERENCE TO RELATED APPLICATIONS

The present application claims priority under 35 U.S.C. § 119 to Japanese Patent Application No. 2013-193616, filed Sep. 19, 2013, entitled "Fuel Cell." The contents of this application are incorporated herein by reference in their entirety.

BACKGROUND

1. Field

The present disclosure relates to a fuel cell.

2. Description of the Related Art

In general, a solid polymer electrolyte fuel cell includes a solid polymer electrolyte membrane, which is made from a solid polymer ion-exchange membrane. The fuel cell includes a membrane electrode assembly (MEA), which includes a solid polymer electrolyte membrane and an anode electrode and a cathode electrode sandwiching the solid polymer electrolyte membrane therebetween. Each of the cathode electrode and the anode electrode includes a catalyst layer (electrode catalyst layer) and a gas diffusion layer (porous carbon). The fuel cell further includes a pair of separators (bipolar plates) sandwiching the MEA therebetween. A predetermined number of such fuel cells are stacked and used, for example, as a vehicle fuel cell stack, which is mounted in a fuel cell vehicle.

In order to prevent gas leak or the like, it is necessary that a fuel gas and an oxidant gas be gas-tightly sealed in a fuel cell. Moreover, in order to maintain a cooling function, it is necessary that a coolant be liquid-tightly sealed in the fuel cell. Therefore, various sealing structures are used in fuel cells.

For example, Japanese Patent No. 4733915 describes a fuel cell that includes a membrane electrode assembly including an electrolyte membrane and a first electrode and a second electrode sandwiching the electrolyte membrane therebetween. The second electrode has a surface area greater than that of the first electrode. The membrane electrode assembly and first and second separators, sandwiching the membrane electrode assembly therebetween, constitute a power generation cell.

First and second sealing members are respectively disposed on the first and second separators. An inner seal and an outer seal are formed on one of surfaces of the second sealing member facing the first electrode. The inner seal is disposed between the electrolyte membrane and the second separator, and the outer seal is disposed between the first and second separators.

A coolant seal is formed on the other surface of the second sealing member, which is opposite to the one of the surfaces, or on one of surfaces of the first sealing member that is opposite to the other surface facing the second electrode. The coolant seal is disposed so as to correspond to the outer seal and so as to seal a coolant channel. The inner seal, the outer seal, and the coolant seal are configured so that they can receive substantially the same sealing linear pressure in the stacking direction against a load applied in the stacking direction.

SUMMARY

According to one aspect of the present invention, a fuel cell includes a membrane electrode assembly and separators, an inner sealing member and an outer sealing member, a coolant channel, a base seal, an inner protrusion and an outer protrusion, and a middle protrusion. The membrane electrode assembly and the separators are stacked. The membrane electrode assembly includes an electrolyte membrane and a pair of electrodes sandwiching the electrolyte membrane therebetween. Each of the separators has an outer size larger than that of the membrane electrode assembly. The inner sealing member and the outer sealing member are disposed between a pair of the separators facing each other with the membrane electrode assembly therebetween. The inner sealing member is in contact with an outer peripheral portion of the membrane electrode assembly. The outer sealing member is located outward from an outer peripheral end portion of the membrane electrode assembly. The coolant channel is formed between separator surfaces of an adjacent pair of the separators. The coolant channel allows a coolant to flow along the separator surfaces. The base seal is disposed on one of the separator surfaces between which the coolant channel is formed. The base seal extends along the separator surface and has a thickness in a height direction that is less than that of each of the inner sealing member and the outer sealing member. The inner protrusion and the outer protrusion are formed on the base seal so as to respectively overlap the inner sealing member and the outer sealing member when viewed in a stacking direction and so as to protrude on the coolant channel side. The middle protrusion is formed on the base seal between the inner protrusion and the outer protrusion so as to protrude on the coolant channel side. The middle protrusion has a thickness in the height direction that is less than that of each of the inner protrusion and the outer protrusion.

According to another aspect of the present invention, a fuel cell includes a membrane electrode assembly and separators, an inner sealing member and an outer sealing member, a coolant channel, a base seal, an inner protrusion and an outer protrusion, and a middle protrusion. The membrane electrode assembly and the separators are stacked in a stacking direction. The membrane electrode assembly includes an electrolyte membrane and a pair of electrodes sandwiching the electrolyte membrane therebetween. Each of the separators has a size larger than a size of the membrane electrode assembly. The separators include a first separator, a second separator and a third separator. The first separator and the second separator sandwich the membrane electrode assembly to contact the membrane electrode assembly. The second separator and the third separator face to contact each other. The inner sealing member and the outer sealing member are disposed between the first separator and the second separator. The inner sealing member is in contact with an outer peripheral portion of the membrane electrode assembly. The outer sealing member is located outward from an outer peripheral end portion of the membrane electrode assembly. The coolant channel is provided between separator surfaces of the second separator and the third separator. The coolant channel allows a coolant to flow along the separator surfaces. The base seal is disposed on at least one of the separator surfaces between the second separator and the third separator. The base seal extends along the separator surfaces and has a thickness in the stacking direction that is less than a thickness in the stacking direction of each of the inner sealing member and the outer sealing member. The inner protrusion and the outer protrusion are provided on the base seal so as to respectively overlap the inner sealing member and the outer sealing member when viewed in the stacking direction and so as to protrude between the second separator and the third separator in the stacking direction. The middle protrusion is provided on the base seal between the inner protrusion and the outer protrusion so as to protrude between the second separator and the third separator in the stacking direction. The middle protrusion has a thickness in the stacking direction that is less than a thickness in the stacking direction of each of the inner protrusion and the outer protrusion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
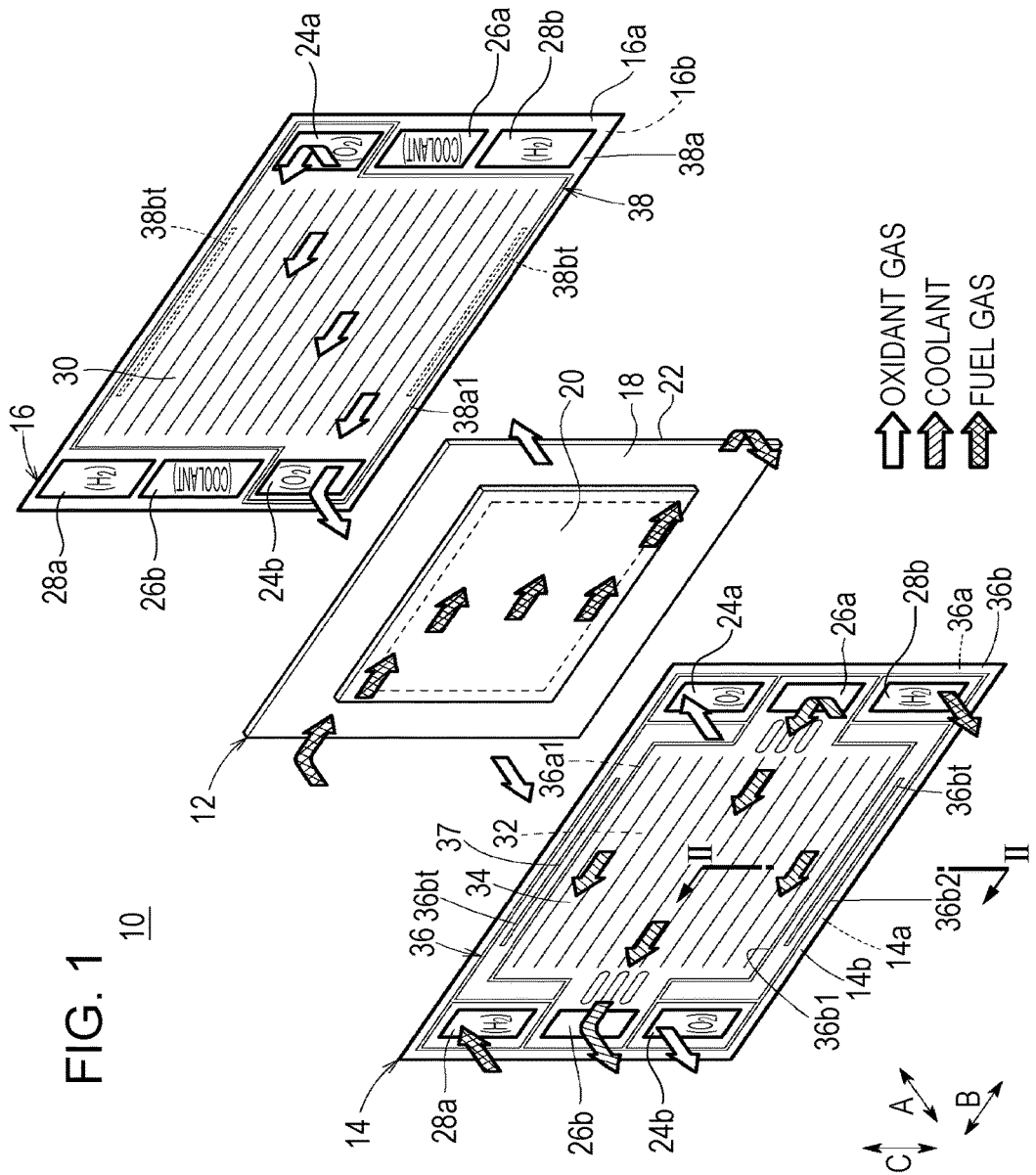
FIG. 1 is an exploded perspective view of a fuel cell according to an embodiment.

The embodiments will now be described with reference to the accompanying drawings, wherein like reference numerals designate corresponding or identical elements throughout the various drawings.

Figure 2:
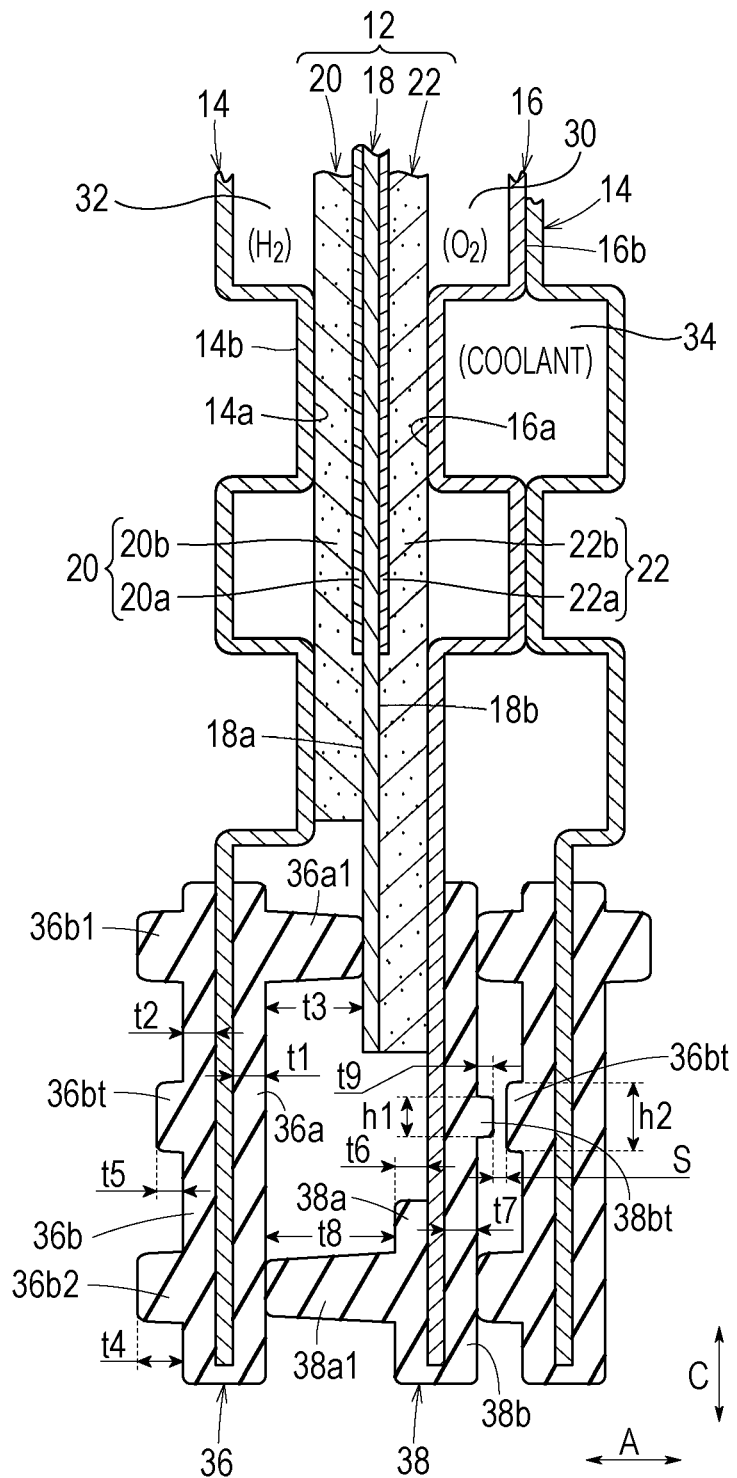
FIG. 2 is a sectional view of the fuel cell taken along line II-II of FIG. 1.

Referring to FIGS. 1 and 2, a fuel cell stack includes a plurality of fuel cells 10 according to an embodiment that are stacked in the direction of arrow A (which is, for example, the horizontal direction). The fuel cell stack is used, for example, as a vehicle fuel cell stack.

Each of the fuel cells 10 includes a membrane electrode assembly 12, and a first metal separator 14 and a second metal separator 16 sandwiching the membrane electrode assembly 12 therebetween. Each of the first metal separator 14 and the second metal separator 16 is made from, for example, a steel plate, a stainless steel plate, an aluminum plate, or a galvanized steel plate. Alternatively, carbon separators may be used instead of the metal separators 14 and 16.

The membrane electrode assembly 12 includes a solid polymer electrolyte membrane 18, and an anode electrode 20 and a cathode electrode 22 sandwiching the solid polymer electrolyte membrane 18 therebetween. The solid polymer electrolyte membrane 18 is, for example, a thin film that is made of perfluorosulfonic acid copolymers and soaked with water. The solid polymer electrolyte membrane 18 may be made from a hydrocarbon (HC) electrolyte, instead of the fluoropolymer electrolyte.

The anode electrode 20 has a size smaller than that of the cathode electrode 22 in a plan view. Alternatively, the cathode electrode 22 may have a size smaller than that of the anode electrode 20 in a plan view. Further alternatively, the cathode electrode 22 and the anode electrode 20 may have the same size in a plan view.

As illustrated in FIG. 2, the anode electrode 20 includes a first electrode catalyst layer 20a and a first gas diffusion layer 20b, which are disposed on a surface 18a of the solid polymer electrolyte membrane 18 in such a way that the outer peripheral portion of the solid polymer electrolyte membrane 18 is exposed to the outside in a frame-like shape. The first gas diffusion layer 20b has a size larger than that of the first electrode catalyst layer 20a in a plan view. Alternatively, the layers 20a and 20b may have the same size in a plan view. The cathode electrode 22 includes a second electrode catalyst layer 22a and a second gas diffusion layer 22b, which are disposed on a surface 18b of the solid polymer electrolyte membrane 18. Each of the first electrode catalyst layer 20a and the second electrode catalyst layer 22a may include a plurality of layers.

The second gas diffusion layer 22b has a size larger than that of the first gas diffusion layer 20b in a plan view. The second gas diffusion layer 22b extends beyond the outer periphery of the second electrode catalyst layer 22a and covers the entirety of the surface 18b of the solid polymer electrolyte membrane 18. The first electrode catalyst layer 20a and the second electrode catalyst layer 22a may have the same size in a plan view. Alternatively, one of the layers 20a and 20b may have a size larger than that of the other.

Each of the first gas diffusion layer 20b and the second gas diffusion layer 22b is made of carbon paper or the like. Each of the first electrode catalyst layer 20a and the second electrode catalyst layer 22a is formed by uniformly coating a surface of a corresponding one of the first gas diffusion layer 20b and the second gas diffusion layer 22b with porous carbon particles whose surfaces support a platinum alloy.

As illustrated in FIG. 1, an oxidant gas inlet manifold 24a, a coolant inlet manifold 26a, and a fuel gas outlet manifold 28b are formed in the fuel cell 10 so as to extend in the direction of arrow A (stacking direction) through one end portion of the fuel cell 10 in the direction of arrow B (the horizontal direction in FIG. 1). An oxidant gas, such as an oxygen-containing gas, is supplied through the oxidant gas inlet manifold 24a. A coolant is supplied through the coolant inlet manifold 26a. A fuel gas, such as a hydrogen-containing gas, is discharged through the fuel gas outlet manifold 28b. The oxidant gas inlet manifold 24a, the coolant inlet manifold 26a, and the fuel gas outlet manifold 28b are arranged in the direction of arrow C (vertical direction).

A fuel gas inlet manifold 28a, a coolant outlet manifold 26b, and an oxidant gas outlet manifold 24b are formed in the fuel cell 10 so as to extend in the direction of arrow A through the other end portion of the fuel cell 10 in the direction of arrow B. The fuel gas is supplied through the fuel gas inlet manifold 28a, the coolant is discharged through the coolant outlet manifold 26b, and the oxidant gas is discharged through the oxidant gas outlet manifold 24b. The fuel gas inlet manifold 28a, the coolant outlet manifold 26b, and the oxidant gas outlet manifold 24b are arranged in the direction of arrow C.

An oxidant gas channel 30, through which the oxidant gas inlet manifold 24a is connected to the oxidant gas outlet manifold 24b, is formed on a surface 16a of the second metal separator 16 facing the membrane electrode assembly 12.

Figure 3:
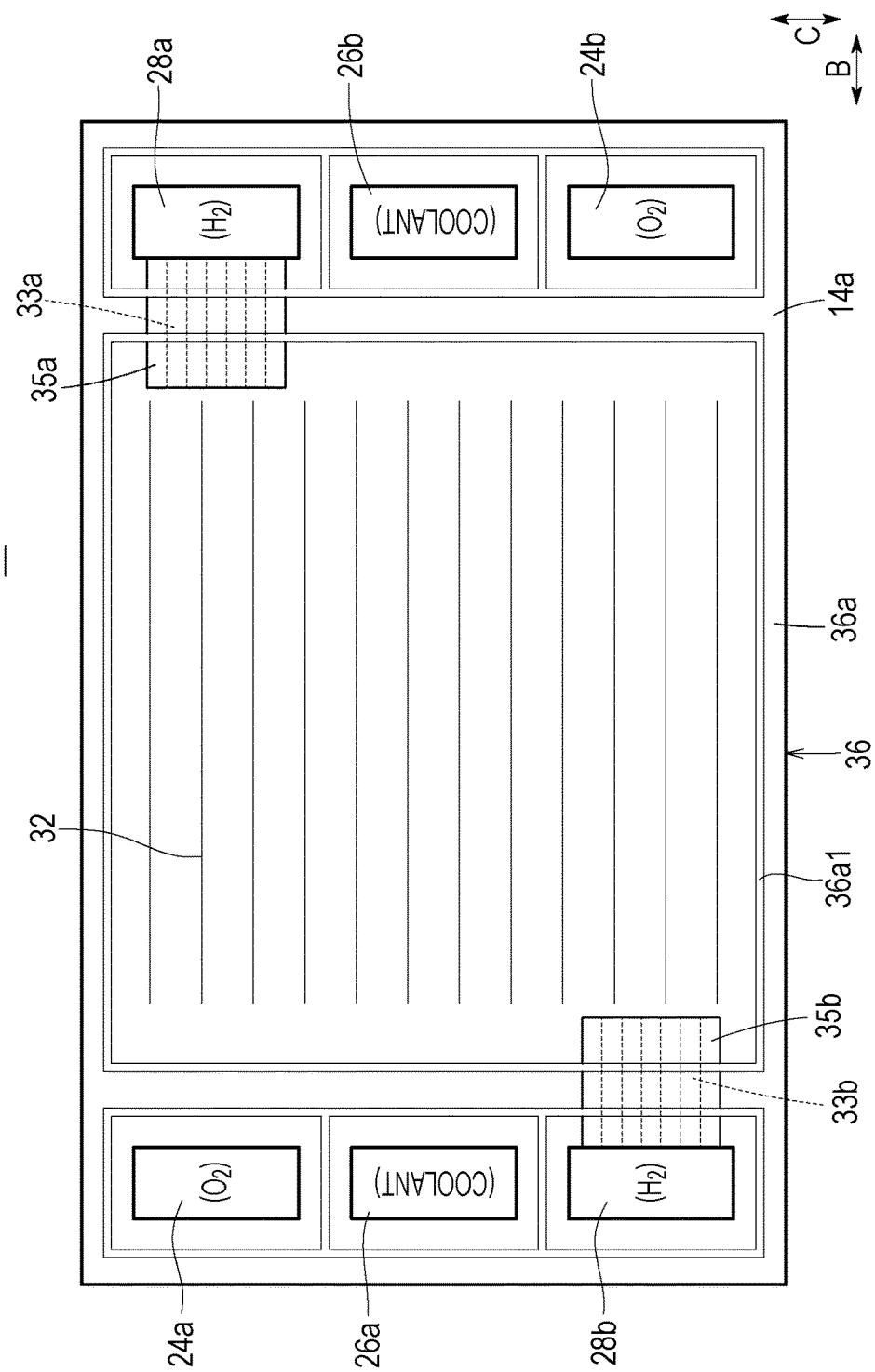
FIG. 3 is a plan view of a first metal separator of the fuel cell.

As illustrated in FIG. 3, a fuel gas channel 32, through which the fuel gas inlet manifold 28a is connected to the fuel gas outlet manifold 28b, is formed on a surface 14a of the first metal separator 14 facing the membrane electrode assembly 12. The fuel gas inlet manifold 28a and the fuel gas channel 32 are connected to each other through a plurality of inlet connection channels 33a. The fuel gas outlet manifold 28b and the fuel gas channel 32 are connected to each other through a plurality of outlet connection channels 33b. The inlet connection channels 33a and the outlet connection channels 33b are respectively covered by a covering 35a and a covering 35b.

Referring to FIG. 1, a coolant channel 34, through which the coolant inlet manifold 26a is connected to the coolant outlet manifold 26b, is formed between a surface 14b of the first metal separator 14 of the fuel cell 10 and a surface 16b of the second metal separator 16 of an adjacent fuel cell 10.

As illustrated in FIGS. 1 and 2, a first sealing member 36 is integrally formed on the surfaces 14a and 14b of the first metal separator 14 so as to surround the outer peripheral end portion of the first metal separator 14. A second sealing member 38 is integrally formed on the surfaces 16a and 16b of the second metal separator 16 so as to surround the outer peripheral end portion of the second metal separator 16.

Each of the first sealing member 36 and the second sealing member 38 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIG. 2, the first sealing member 36 includes a first flat seal 36a (base seal), which is integrally formed on the surface 14a of the first metal separator 14, and a second flat seal 36b (base seal), which is integrally formed on the surface 14b of the first metal separator 14. The first flat seal 36a extends along the surface 14a and has a thickness t1 in the height direction. The second flat seal 36b extends along the surface 14b and has a thickness t2 in the height direction. By setting the thickness t1>the thickness t2, the height of a seal on a separator surface along which the coolant flows can be reduced, and therefore the thickness of the fuel cell 10 can be reduced.

An inner sealing member 36a1 is integrally formed with the first flat seal 36a. The inner sealing member 36a1 is in direct contact with an outer peripheral portion of the solid polymer electrolyte membrane 18 of the membrane electrode assembly 12. In other words, the inner sealing member 36a1, having a frame-like shape, surrounds and contacts the outer peripheral portion of the solid polymer electrolyte membrane 18, which is exposed to the outside from an outer peripheral end portion of the first gas diffusion layer 20b of the anode electrode 20 (see FIG. 3). The inner sealing member 36a1 has a thickness t3 in the height direction that is greater than the thickness t1 of the first flat seal 36a and the thickness t2 of the second flat seal 36b.

As illustrated in FIGS. 1 and 2, an inner protrusion 36b1 and an outer protrusion 36b2 are integrally formed with the second flat seal 36b. The inner protrusion 36b1 is disposed so as to overlap the inner sealing member 36a1 when viewed in the stacking direction. The outer protrusion 36b2 is disposed so as to overlap an outer sealing member 38a1 (described below) when viewed in the stacking direction. Middle protrusions 36bt are formed on the second flat seal 36b so as to be located between the inner protrusion 36b1 and the outer protrusion 36b2 and so as to protrude on the coolant channel 34 side. As illustrated in FIG. 1, the middle protrusions 36bt are disposed on an upper portion and a lower portion of the surface 14b of the first metal separator 14 so as to extend linearly in the longitudinal direction (direction of arrow B). Each of the middle protrusions 36bt has a molding gate 37 in a central portion thereof in the longitudinal direction.

As illustrated in FIG. 2, the inner protrusion 36b1 and the outer protrusion 36b2 have the same thickness t4 in the height direction. Each of the middle protrusions 36bt has a thickness t5 in the height direction. The thickness of each of the middle protrusions 36bt in the height direction is less that that of each of the inner protrusion 36b1 and the outer protrusion 36b2 (t4>t5).

The second sealing member 38 includes a first flat seal 38a (base seal), which is integrally formed on the surface 16a of the second metal separator 16, and a second flat seal 38b (base seal), which is integrally formed on the surface 16b of the second metal separator 16. The first flat seal 38a extends along the surface 16a and has a thickness t6 in the height direction. The second flat seal 38b extends along the surface 16b and has a thickness t7 in the height direction. By setting the thickness t6>the thickness t7, the height of a seal on a separator surface along which the coolant flows can be reduced, and therefore the thickness of the fuel cell 10 can be reduced.

The outer sealing member 38a1 is integrally formed with the first flat seal 38a. The outer sealing member 38a1 is located outward from the outer peripheral end portion of the solid polymer electrolyte membrane 18 of the membrane electrode assembly 12 and is in direct contact with the first flat seal 36a of the first sealing member 36. The outer sealing member 38a1 extends along the outer peripheral portion of the first flat seal 36a so as to surround the outer peripheral portion (see FIG. 1).

The outer sealing member 38a1 has a thickness t8 in the height direction that is greater than the thickness t6 of the first flat seal 38a and the thickness t7 of the second flat seal 38b. The outer sealing member 38a1 may be integrally formed with the first flat seal 36a of the first sealing member 36 and may be in direct contact with the first flat seal 38a.

As illustrated in FIGS. 1 and 2, protrusions 38bt are formed on the second flat seal 38b so as to face the middle protrusions 36bt in the stacking direction. Each of the protrusions 38bt has a thickness t9 in the height direction that is equivalent to the thickness t5 of each of the middle protrusions 36bt (see FIG. 2). As illustrated in FIG. 1, the protrusions 38bt are disposed on an upper portion and a lower portion of the surface 16b of the second metal separator 16 so as to extend linearly in the longitudinal direction (direction of arrow B).

As illustrated in FIG. 2, each of the protrusions 38bt has a width h1 that is less than the width h2 of each of the middle protrusions 36bt (h1<h2). A space s is formed between each of the protrusions 38bt and a corresponding one of the middle protrusions 36bt. Each of the middle protrusions 36bt may have a bulge in the vicinity of the molding gate 37. It is preferable that the space s be formed so that end portions of the protrusions 38bt and end portions of the middle protrusions 36bt may not contact each other and may not receive a load.

The operation of the fuel cell 10 having the aforementioned structure will be described.

First, as illustrated in FIG. 1, an oxidant gas, such as an oxygen-containing gas, is supplied to the oxidant gas inlet manifold 24a. A fuel gas, such as a hydrogen-containing gas, is supplied to the fuel gas inlet manifold 28a. A coolant, such as pure water, ethylene glycol, or oil, is supplied to the coolant inlet manifold 26a.

The oxidant gas is introduced from the oxidant gas inlet manifold 24a into the oxidant gas channel 30 of the second metal separator 16. The oxidant gas flows in the direction of arrow B and is supplied to the cathode electrode 22 of the membrane electrode assembly 12 (see FIG. 1).

Referring to FIG. 3, the fuel gas is supplied from the fuel gas inlet manifold 28a to the fuel gas channel 32 through the inlet connection channels 33a of the first metal separator 14. The fuel gas flows along the fuel gas channel 32 in the direction of arrow B and is supplied to the anode electrode 20 of the membrane electrode assembly 12.

Accordingly, in the membrane electrode assembly 12, the fuel gas supplied to the anode electrode 20 and the oxidant gas supplied to the cathode electrode 22 are consumed in electrochemical reactions in the first electrode catalyst layer 20a and the second electrode catalyst layer 22a, and therefore electric power is generated.

Next, the oxidant gas, which has been supplied to the cathode electrode 22 and consumed, is discharged along the oxidant gas outlet manifold 24b in the direction of arrow A. Likewise, referring to FIG. 3, the fuel gas, which has been supplied to the anode electrode 20 and consumed, is discharged in the direction of arrow A from the outlet connection channel 33b and along the fuel gas outlet manifold 28b.

The coolant, which has been supplied to the coolant inlet manifold 26a, is introduced into the coolant channel 34 between the first metal separator 14 and the second metal separator 16 and flows in the direction of arrow B. The coolant cools the membrane electrode assembly 12 and is subsequently discharged from the coolant outlet manifold 26b.

In the present embodiment, as illustrated in FIG. 2, the first sealing member 36, which is disposed on the first metal separator 14, includes the second flat seal 36b (base seal), and the inner protrusion 36b1 and the outer protrusion 36b2 are formed so as to protrude from the second flat seal 36b. Each of the middle protrusions 36bt is formed between the inner protrusion 36b1 and the outer protrusion 36b2 so as to protrude from the second flat seal 36b. Therefore, by using the middle protrusions 36bt as runners for supplying a molding material therethrough, the moldability of the first sealing member 36 is improved, and the height (thickness t2) of the second flat seal 36b can be maximally reduced.

Thus, an advantage is obtained in that the thickness of the first metal separator 14 can be reduced while obtaining a desirable sealability, and the first sealing member 36 can be appropriately and reliably molded.

In the second sealing member 38, the protrusions 38bt are formed on the second flat seal 38b so as to face the middle protrusions 36bt in the stacking direction. By using the protrusions 38bt as runners for supplying a molding material therethrough, the moldability of the second sealing member 38 can improved, and the height (thickness t7) of the second flat seal 38b can be maximally reduced.

Thus, an advantage is obtained in that the thickness of the second metal separator 16 can be reduced while obtaining a desirable sealability, and the second sealing member 38 can be appropriately and reliably molded. Moreover, the protrusions 38bt can contact the middle protrusions 36bt. Therefore, an advantage is obtained in that a load applied to the second flat seals 36b and 38b can be reliably received.

In the present embodiment, the fuel cell 10 includes the single membrane electrode assembly 12 (MEA), which is sandwiched between the first metal separator 14 and the second metal separator 16. However, this is not a limitation. For example, the fuel cell 10 may include two MEAs and three separators that are alternately stacked.

According to the present disclosure, a fuel cell includes a membrane electrode assembly and separators that are stacked, the membrane electrode assembly including an electrolyte membrane and a pair of electrodes sandwiching the electrolyte membrane therebetween, each of the separators having an outer size larger than that of the membrane electrode assembly. An inner sealing member and an outer sealing member are disposed between a pair of the separators facing each other with the membrane electrode assembly therebetween. The inner sealing member is in contact with an outer peripheral portion of the membrane electrode assembly, and the outer sealing member is located outward from an outer peripheral end portion of the membrane electrode assembly.

A coolant channel is formed between separator surfaces of an adjacent pair of the separators. The coolant channel allows a coolant to flow along the separator surfaces. A base seal is disposed on one of the separator surfaces between which the coolant channel is formed. The base seal extends along the separator surface and has a thickness in a height direction that is less than that of each of the inner sealing member and the outer sealing member.

An inner protrusion and an outer protrusion are formed on the base seal so as to respectively overlap the inner sealing member and the outer sealing member when viewed in a stacking direction and so as to protrude on the coolant channel side. A middle protrusion is formed on the base seal between the inner protrusion and the outer protrusion so as to protrude on the coolant channel side. The middle protrusion has a thickness in the height direction that is less than that of each of the inner protrusion and the outer protrusion.

Preferably, the fuel cell further includes a flat seal disposed on the other one of the separator surfaces between which the coolant channel is formed, the flat seal extending along the separator surface and having a thickness in the height direction that is less than that of each of the inner sealing member and the outer sealing member; and a protrusion is formed on the flat seal so as to face the middle protrusion.

Preferably, the middle protrusion includes a molding gate in a central portion thereof in a longitudinal direction.

Preferably, the base seal on the coolant channel side has a height less than that of a base seal on a reactant gas channel side.

According to the present disclosure, the inner protrusion and the outer protrusion are formed on the base seal so as to protrude from the base seal. Moreover, the middle is formed on the base seal so as to protrude from the base seal. Therefore, by using the middle protrusion as a molding runner, the moldability of the sealing member is improved, and the height (thickness) of the base seal can be maximally reduced.

Thus, the thickness of the separator can be reduced while obtaining a desirable sealability, and the sealing member can be appropriately molded without fail.

Obviously, numerous modifications and variations of the present invention are possible in light of the above teachings. It is therefore to be understood that within the scope of the appended claims, the invention may be practiced otherwise than as specifically described herein.

What is claimed is:
1. A fuel cell comprising:
   a membrane electrode assembly and separators that are stacked in a stacking direction, the membrane electrode assembly including an electrolyte membrane and a pair of electrodes sandwiching the electrolyte membrane therebetween, each of the separators having an outer size larger than that of the membrane electrode assembly;
   an inner sealing member and an outer sealing member that are disposed between a pair of the separators facing each other with the membrane electrode assembly therebetween, the inner sealing member being in contact with an outer peripheral portion of the membrane electrode assembly, the outer sealing member being located outward from an outer peripheral end portion of the membrane electrode assembly;
   a coolant channel formed between separator surfaces of an adjacent pair of the separators, the coolant channel allowing a coolant to flow along the separator surfaces;

a base seal directly connected to a first separator surface of the separator surfaces between which the coolant channel is formed, the base seal extending along the separator surface and having a thickness in the stacking direction that is less than that of each of the inner sealing member and the outer sealing member;
an inner protrusion and an outer protrusion continuously formed with the base seal so as to respectively overlap the inner sealing member and the outer sealing member when viewed in the stacking direction and so as to protrude on the coolant channel side;
a middle protrusion formed on the base seal between the inner protrusion and the outer protrusion so as to protrude on the coolant channel side, the middle protrusion having a thickness in the stacking direction that is less than that of each of the inner protrusion and the outer protrusion; and
wherein the inner protrusion, the outer protrusion, and the middle protrusion are each continuously formed with the base seal.

2. The fuel cell according to claim 1, further comprising:
a flat seal disposed on a second separator surface of the separator surfaces between which the coolant channel is formed, the flat seal extending along the separator surface and having a thickness in the stacking direction that is less than that of each of the inner sealing member and the outer sealing member; and
a protrusion formed on the flat seal so as to face the middle protrusion.

3. The fuel cell according to claim 1,
wherein the middle protrusion includes a molding gate in a central portion thereof in a longitudinal direction.

4. The fuel cell according to claim 1,
wherein the base seal on the coolant channel side has a height less than that of a base seal on a reactant gas channel side.

5. The fuel cell according to claim 1,
wherein the base seal is mounted on the first separator surface.

6. The fuel cell according to claim 1,
wherein the inner sealing member is directly connected to one separator of the pair of separators, and
wherein the outer sealing member is directly connected to another separator of the pair of separators.

7. The fuel cell according to claim 1,
wherein the base seal extends continuously from the first separator surface of a first separator around an outermost peripheral edge of the first separator to a second separator surface of the first separator, the second separator surface being opposite to the first separator surface in the stacking direction.

8. A fuel cell comprising:
a membrane electrode assembly and separators that are stacked in a stacking direction, the membrane electrode assembly including an electrolyte membrane and a pair of electrodes sandwiching the electrolyte membrane therebetween, each of the separators having a size larger than a size of the membrane electrode assembly, the separators including a first separator, a second separator and a third separator, the first separator and the second separator sandwiching the membrane electrode assembly to contact the membrane electrode assembly, the second separator and the third separator facing to contact each other;
an inner sealing member and an outer sealing member that are disposed between the first separator and the second separator, the inner sealing member being in contact with an outer peripheral portion of the membrane electrode assembly, the outer sealing member being located outward from an outer peripheral end portion of the membrane electrode assembly;
a coolant channel provided between separator surfaces of the second separator and the third separator, the coolant channel allowing a coolant to flow along the separator surfaces;
a base seal disposed on a first separator surface of the separator surfaces between the second separator and the third separator, the base seal extending along the separator surfaces and having a thickness in the stacking direction that is less than a thickness in the stacking direction of each of the inner sealing member and the outer sealing member;
an inner protrusion and an outer protrusion provided on the base seal so as to respectively overlap the inner sealing member and the outer sealing member when viewed in the stacking direction, the inner protrusion and the outer protrusion being disposed between the second separator and the third separator when viewed in the stacking direction;
a middle protrusion provided on the base seal between the inner protrusion and the outer protrusion so as to protrude between the second separator and the third separator in the stacking direction, the middle protrusion having a thickness in the stacking direction that is less than a thickness in the stacking direction of each of the inner protrusion and the outer protrusion; and
wherein the inner protrusion, the outer protrusion, and the middle protrusion are each continuously formed with the base seal.

9. The fuel cell according to claim 8, further comprising:
a flat seal disposed on a second separator surface of the separator surfaces between the second separator and the third separator, the flat seal extending along the separator surfaces and having a thickness in the stacking direction that is less than a thickness in the stacking direction of each of the inner sealing member and the outer sealing member; and
a protrusion provided on the flat seal so as to face the middle protrusion.

10. The fuel cell according to claim 8,
wherein the middle protrusion includes a molding gate in a central portion thereof in a longitudinal direction.

11. The fuel cell according to claim 8,
wherein the base seal on a coolant channel side has a height in the stacking direction less than a height in the stacking direction of a base seal on a reactant gas channel side.

12. The fuel cell according to claim 9,
wherein the protrusion and the middle protrusion each have a width along the separator surfaces in a direction perpendicular to a flow direction of the coolant, and
wherein the width of the protrusion is less than the width of the middle protrusion.

13. The fuel cell according to claim 9,
wherein a space is provided between the protrusion and the middle protrusion in the stacking direction.

14. The fuel cell according to claim 8,
wherein the base seal is mounted on the first separator surface.

15. The fuel cell according to claim 8,
wherein the inner sealing member is directly connected to one of the first separator and the second separator, and
wherein the outer sealing member is directly connected to another of the first separator and the second separator.

16. The fuel cell according to claim 8,
wherein the base seal is directly connected to the third separator, and
wherein the inner protrusion and the outer protrusion are continuously formed with the base seal.

17. The fuel cell according to claim 8,
wherein the base seal extends continuously from the first separator surface of a third separator around an outermost peripheral edge of the third separator to a second separator surface of the third separator, the second separator surface being opposite to the first separator surface in the stacking direction.

* * * * *